(12) United States Patent
Badding et al.

(10) Patent No.: US 11,791,465 B2
(45) Date of Patent: Oct. 17, 2023

(54) SINTERED ELECTRODES FOR BATTERIES AND METHOD OF PREPARING SAME

(71) Applicant: CORNING INCORPORATED, Corning, NY (US)

(72) Inventors: Michael Edward Badding, Campbell, NY (US); Ryan David Bayliss, Brooklyn, NY (US); Jennifer Anella Heine, Belleair Bluffs, FL (US); Cameron Wayne Tanner, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/848,627

(22) Filed: Jun. 24, 2022

(65) Prior Publication Data

US 2022/0328826 A1    Oct. 13, 2022

Related U.S. Application Data

(63) Continuation of application No. 16/519,350, filed on Jul. 23, 2019.

(60) Provisional application No. 62/807,355, filed on Feb. 19, 2019.

(51) Int. Cl.
*H01M 4/58* (2010.01)
*H01M 10/0525* (2010.01)
(Continued)

(52) U.S. Cl.
CPC ......... *H01M 4/581* (2013.01); *H01M 4/0471* (2013.01); *H01M 10/0525* (2013.01);
(Continued)

(58) Field of Classification Search
CPC ............... H01M 4/581; H01M 4/0471; H01M 10/0525; H01M 10/0562; H01M 2004/021; H01M 2004/028; H01M 2300/0068
See application file for complete search history.

(56) References Cited

U.S. PATENT DOCUMENTS

| | | |
|---|---|---|
| 5,089,455 A | 2/1992 | Ketcham et al. |
| 5,561,004 A | 10/1996 | Bates et al. |

(Continued)

FOREIGN PATENT DOCUMENTS

| | | |
|---|---|---|
| EP | 3511137 A1 | 7/2019 |
| JP | 2010-272425 A | 12/2010 |

(Continued)

OTHER PUBLICATIONS

EPO machine generated English translation of JP-2012099225-A (Year: 2012).*

(Continued)

*Primary Examiner* — Sean P Cullen
*Assistant Examiner* — Kimberly Wyluda

(57) ABSTRACT

Methods of making a sintered electrode comprise forming a slurry including 40 wt % to 75 wt % of a powder comprising a chalcogenide and at least one of an alkali metal or an alkaline earth metal, 1 wt % to 10 wt % of a binder, and 30 wt % to 50 wt % of a solvent. Methods include casting the slurry into a green tape. Methods include drying the green tape to form a dried green tape by removing at least a portion of the solvent. The dried green tape includes at most 10 wt % of organic material in the dried green tape. Methods include sintering the dried green tape at a temperature from 500° C. to 1350° C. for no more than 60 minutes to form the sintered electrode.

19 Claims, 8 Drawing Sheets

(51) Int. Cl.
  *H01M 10/0562* (2010.01)
  *H01M 4/04* (2006.01)
  *H01M 4/02* (2006.01)

(52) U.S. Cl.
  CPC .. *H01M 10/0562* (2013.01); *H01M 2004/021* (2013.01); *H01M 2004/028* (2013.01); *H01M 2300/0068* (2013.01)

(56) References Cited

U.S. PATENT DOCUMENTS

| | | | |
|---|---|---|---|
| 10,700,378 B2 | 6/2020 | Sakamoto et al. | |
| 10,892,486 B2 | 1/2021 | Yushin et al. | |
| 2009/0246636 A1 | 10/2009 | Chiang et al. | |
| 2011/0003211 A1 | 1/2011 | Hudson et al. | |
| 2012/0052336 A1* | 3/2012 | Chung | H01M 6/36 429/11 |
| 2015/0099188 A1 | 4/2015 | Holme et al. | |
| 2016/0336617 A1 | 11/2016 | Yamazaki | |
| 2017/0173893 A1 | 6/2017 | Li et al. | |
| 2017/0179521 A1* | 6/2017 | Sakamoto | H01M 4/0402 |
| 2017/0210634 A1 | 7/2017 | Badding et al. | |
| 2018/0114977 A1 | 4/2018 | Sakamoto et al. | |
| 2018/0277889 A1 | 9/2018 | Anandan et al. | |
| 2019/0177238 A1* | 6/2019 | Yi | C04B 35/6264 |
| 2019/0207252 A1 | 7/2019 | Badding et al. | |
| 2019/0260066 A1 | 8/2019 | Hu et al. | |
| 2019/0363357 A1 | 11/2019 | Yura et al. | |
| 2020/0175539 A1 | 6/2020 | Hudson et al. | |
| 2020/0243842 A1 | 7/2020 | Aronov | |
| 2020/0358086 A1 | 11/2020 | Hu et al. | |
| 2021/0020932 A1 | 1/2021 | Badding et al. | |

FOREIGN PATENT DOCUMENTS

| | | | |
|---|---|---|---|
| JP | 2012099225 A | * | 5/2012 |
| WO | 2017/106817 A1 | | 6/2017 |
| WO | 2018/025594 A1 | | 2/2018 |
| WO | 2018/118964 A1 | | 6/2018 |
| WO | 2018/147387 A1 | | 8/2018 |
| WO | 2018/155155 A1 | | 8/2018 |
| WO | 2020/171939 A1 | | 8/2020 |
| WO | 2021/061502 A1 | | 4/2021 |
| WO | 2021/202268 A1 | | 10/2021 |

OTHER PUBLICATIONS

PubChem SDS for 1-Methoxy-2-propyl acetate (Year: 2005).*
Arora et al; "Capacity Fade Mechanisms and Side Reactions in Lithium-Ion Batteries"; J. Electrochem. Soc., vol. 145, No. 10; 1998; pp. 3647-3667.
Bandhauer et al; "A Critical Review of Thermal Issues in Lithium-Ion Batteries"; Jounral of He Electrochemical Society, 158 (3); R1-R25 (2011.
Bates et al; "Electrical Properties of Amorphous Lithium Electrolyte Thin Films"; Solid State Ionics 53-56 (1992) pp. 647-654.
Bates et al; "Thin-Film Rechargeable Lithium Battery," Journal of Power Sources, 54 (1995) pp. 58-62.
Davidson et al; "Low Cost, Novel Methods for Fabricating All-Solid-State Lithium Ion Batteries," Bachelor's Project at Worchester Polytechnic Institute, Apr. 23, 2013, 126 Pages.
Dudney; "Thin Film Micro-Batteries"; The Electrochemical Society Interface, 2008 pp. 44-48.
Energy Education: Definition of cross-sectional ares (Year: 2016).
English translation of WO-2018025594-A1 (Year: 2018).
Howell et al; "Overview of the DOE VTO Advanced Batiery R&D Program"; US Department of Energy; (2016) 24 Pages.
International Search Report and Written Opinion of the International Searching Authority; PCT/US2020/016484; dated Jun. 4, 2020; 11 Pages; European Patent Office.
Jonson et al; "Tape Casting and Sintering of Li7La3Zr1.75Nb0.25Al0.1O12 With Li3BO3 Additions" Solid State Ionics, 323 (2018) pp. 49-55.
Lai Et La; "Ultrahigh-Energy-Density Microbatieries Enabled by New Electrode Architecture and Micropackaging Design," 22 (2010) E139-144.
Larsson et al; "Toxic Fluoride Gas Emissions From Lithium-Ion Battery Fires"; Nature, Scientific Reports; 7:10018; 13 Pages (2017).
Lee et al; "A Simple Wireless Power Charging Antenna System: Evaluation of Ferrite Sheet"; IEEE Transactions on Magnetics, vol. 53, No. 7, (2017) 5 Pages.
Liu et al; "Long Cycle Life Lithium Ion Batiery With Lithium Nickel Cobalt Manganese Oxide NCM) Cathode"; Journal of Power Sources, 261 (2014) pp. 285-291.
Matsuda et al; "Thin-Film Lithium Batteries With 0.3-30m Thick LiCoO2 Films Fabricated by High-Rate Pulsed Laser Deposition"; Solid State Ionics, 320 (2018) pp. 38-44.
Munoz et al; "Increased Electrical Conductivity of Upon Glasses Produced by Ammonolysis"; Solid State Ionics, 179 (2008) pp. 574-579.
Senevirathne et al; "A New Crystalline LiPON Electrolyte: Synthesis, Properties, and Electronic Structure"; Solid State Ionics, 233 (2013) pp. 95-101.
Wu et al; "Potassium-Sodium Niobate Lead-Free Piezoelectric Materials: Past, Present, and Future of Phase Boundaries," Chem. Rev., 117 (2015) 2559-2595.
Yi et al; "Flame Made Nanoparticles Permit Processing of Dense, Flexible, Li+ Conducting Ceramic Electrolyte Thin Films of Cubic-Li7La3Zr2O12 (c-LLZO)," J. Mater. Chem. A., 4 (2016) 12947-12954.
Yi et al; "Key Parameters Governing the Densification of Cubic-Li7La3Zr2O12Li+ Conductors"; Journal of Power Sources, 352, (2017) pp. 156-164.

* cited by examiner

FIG. 6A
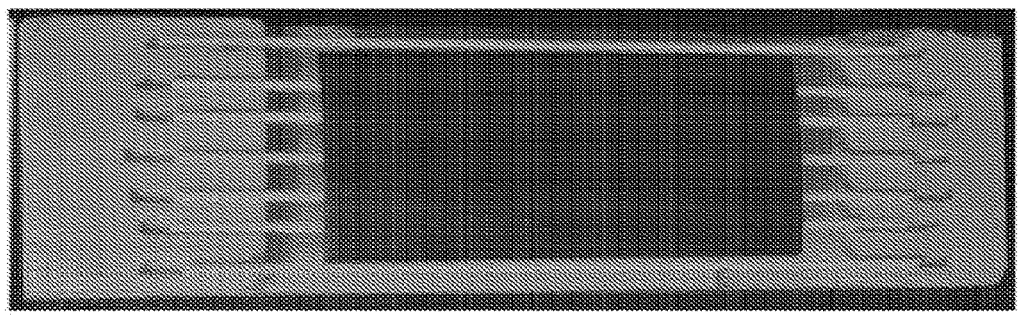
(a)
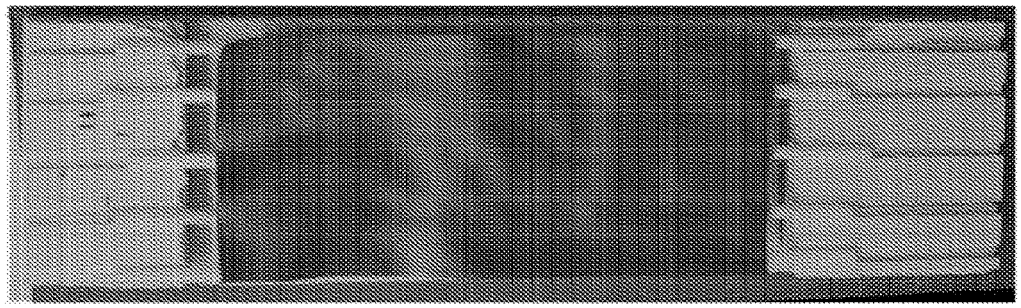
(b)
FIG. 6B
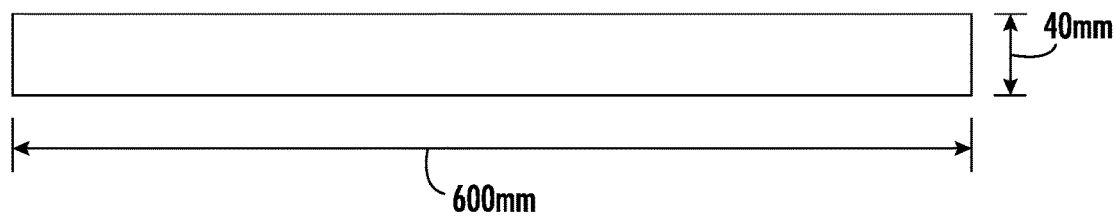
FIG. 7

US 11,791,465 B2

SINTERED ELECTRODES FOR BATTERIES AND METHOD OF PREPARING SAME

CROSS REFERENCE TO RELATED APPLICATIONS

This application is a continuation of and claims the benefit of priority under 35 U.S.C § 120 to U.S. Non-provisional patent application Ser. No. 16/519,350, which claims the benefit of priority under 35 U.S.C. § 119 to U.S. Provisional Patent Application No. 62/807,355, filed Feb. 19, 2019, the content of which is relied upon and incorporated herein by reference in its entirety.

BACKGROUND

The disclosure relates generally to an electrode for a battery and to a method of preparing same. Various types of battery chemistries exist. Lithium-ion batteries are currently a popular chemistry for a variety of applications. For example, lithium-ion battery technology that is based upon liquid carbonate electrolytes and intercalation electrodes are used in a variety of small electronic devices, such as cellular telephones, laptop computers, and cordless power tools, and also in larger applications, such as hybrid and all electric vehicles and to stabilize electric grids at local and national levels under periods of high demand. Despite the wide-ranging adoption and use of lithium-ion batteries, demand still exists for batteries with higher energy density, smaller size, lighter weight, and lower cost.

Moreover, irreversible reactions often facilitated by the liquid electrolyte lead to fade in capacity. Further, the range of temperatures for operation and charging of lithium batteries with liquid electrolyte is restricted. Overheating is damaging to cell lifetime, and to guard against overheating, lithium-ion batteries employ protection circuits to reduce current draw or charging rate. Temperature is actively managed in applications like electric vehicles where the batteries are densely packed in order to minimize volume.

Still further, the ability to charge quickly is valued in consumer electronics, and many recently manufactured devices can be charged to 80% of capacity is less than hour, albeit with potential loss of battery life. The expectation of quick charging is even more pressing for electric vehicles. Even though a typical charging time is around 45 minutes, the expectation is that the battery of an electric vehicle can be charged to full in a time comparable to refueling of a gasoline powered vehicle of around 5 minutes.

SUMMARY

In one aspect, embodiments of the disclosure relate to embodiments of a sintered electrode for a battery. The sintered electrode has a first surface configured to be arranged facing a current collector and a second surface configured to be arranged facing an electrolyte layer. The sintered electrode includes a chalcogenide compound having at least one of an alkali metal or an alkaline earth metal. The sintered electrode has a thickness between the first surface and the second surface of 2 µm to 100 µm and cross-sectional area of the first surface and of the second surface of at least 3 cm$^2$. Further, the sintered electrode has a porosity of from 0.1% to 30%.

In another aspect, embodiments of the disclosure relate to a method of preparing a sintered electrode for a battery. In the method, a slurry or paste is provided. The slurry paste includes 40% to 75% by weight of a powder component including a chalcogenide and at least one alkali metal or alkaline earth metal, 1% to 10% by weight of a binder, and 30% to 50% by weight of a solvent. Further, in the method, the slurry is formed into a green tape having a thickness of 2 µm to 100 µm. The green tape is dried such that the green tape contains at most 10% by weight of organic material, and the green tape is sintered at a temperature of from 500° C. to 1350° C. for a time of no more than 60 min to form a sintered tape.

In still another aspect, embodiments of the disclosure relate to a battery. The battery includes a cathode, an electrolyte region, and an anode. At least one of the cathode or the anode is a sintered electrode having a first surface and a second surface. The sintered electrode includes a chalcogenide compound including at least one of an alkali metal or an alkaline earth metal. The sintered electrode has a thickness between the first surface and the second surface of from 2 µm to 100 µm and cross-sectional area of the first surface and of the second surface of at least 3 cm$^2$.

In some embodiments, a sintered electrode for a battery, the sintered electrode having a first surface configured to be positioned facing a current collector and a second surface configured to be positioned facing an electrolyte layer, wherein the sintered electrode comprises: a chalcogenide compound comprising at least one of an alkali metal or an alkaline earth metal; wherein the sintered electrode has a thickness between the first surface and the second surface of 2 µm to 100 µm; and wherein the sintered electrode has an open porosity of from 0.1% to 30%.

In one aspect, which is combinable with any of the other aspects or embodiments, the chalcogenide compound comprises at least one of lithium cobaltite, lithium manganite spinel, lithium nickel cobalt aluminate, lithium iron phosphate, lithium cobalt phosphate, lithium titanate, lithium niobium tungstate, or lithium titanium sulfide.

In one aspect, which is combinable with any of the other aspects or embodiments, the chalcogenide compound comprises a solid phase of the sintered electrode, wherein the open porosity comprises a pore phase which is continuous within the solid phase. In one aspect, which is combinable with any of the other aspects or embodiments, the pore phase provides fluid communication between the first surface and the second surface. In one aspect, which is combinable with any of the other aspects or embodiments, the sintered electrode comprises a first phase and a second phase wherein the first phase comprises a chalcogenide compound and wherein the second phase is intermixed with the first phase.

In some embodiments, a cathode for a battery, comprises: a sintered electrode having a first surface and a second surface; wherein: the sintered electrode has a thickness between the first surface and the second surface in a range of 2 µm to 100 µm, and the sintered electrode comprises lithium chalcogenide selected from at least one of: lithium cobaltite (LCO), lithium manganite spinel (LMO), lithium nickel cobalt aluminate (NCA), lithium iron phosphate (LFP), lithium cobalt phosphate (LCP), lithium titanate, lithium niobium tungstate, lithium nickel manganate, and lithium titanium sulfide (LiTiS$_2$).

In one aspect, which is combinable with any of the other aspects or embodiments, a charging capacity of the sintered cathode is maintained at greater than 135 mA·hr/g after twenty charge-discharge cycles at a C/5 rate and 4.3 V charging potential. In one aspect, which is combinable with any of the other aspects or embodiments, a cross-sectional area of the sintered cathode is at least 3 cm$^2$. In one aspect, which is combinable with any of the other aspects or embodiments, a battery comprises: a cathode as described herein; an electrolyte region penetrating a porous region of the cathode; wherein the cathode is a substrate of the battery. In one aspect, which is combinable with any of the other aspects or embodiments, the electrolyte region comprises a solid electrolyte being at least one of: lithium-phosphorous-oxynitride (LiPON), lithium garnet ($Li_7La_3Zr_2O_{12}$), or lithium phosphosulfide.

In one aspect, which is combinable with any of the other aspects or embodiments, the battery further comprises: a current collector disposed on a surface of the sintered electrode. In one aspect, which is combinable with any of the other aspects or embodiments, the current collector has a thickness of less than 5 μm. In one aspect, which is combinable with any of the other aspects or embodiments, a volume of the battery is less than a volume of a battery comprising a cathode disposed over a substrate. In one aspect, which is combinable with any of the other aspects or embodiments, a capacity of the battery is at least seven-fold higher in volumetric or absolute terms than a capacity of a battery comprising a cathode disposed over a substrate. In one aspect, which is combinable with any of the other aspects or embodiments, a capacity of the battery is at least ten-fold higher on a weight basis than a capacity of a battery comprising a cathode disposed over a substrate.

In some embodiments, a cathode for a battery, comprises: a sintered electrode having a first surface and a second surface; wherein the sintered electrode: has a thickness between the first surface and the second surface in a range of 2 μm to 100 μm, has a cross-sectional area of at least 3 $cm^2$, and is a substrate of the battery. In one aspect, which is combinable with any of the other aspects or embodiments, a charging capacity of the sintered cathode is maintained at greater than 135 mA·hr/g after twenty charge-discharge cycles at a C/5 rate and 4.3 V charging potential. In one aspect, which is combinable with any of the other aspects or embodiments, a volume of the battery is less than a volume of a battery comprising a cathode disposed over a substrate. In one aspect, which is combinable with any of the other aspects or embodiments, a capacity of the battery is at least seven-fold higher in volumetric or absolute terms than a capacity of a battery comprising a cathode disposed over a substrate. In one aspect, which is combinable with any of the other aspects or embodiments, a capacity of the battery is at least ten-fold higher on a weight basis than a capacity of a battery comprising a cathode disposed over a substrate.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

FIGS. 6A and 6B depict an image of LCO tape rapidly debound and sintered with a soak temperature of 1100° C. for a time of 20 min and an image of LCO tape rapidly debound and sintered with a soak temperature of 1100° C. for a time of 1.25 min, respectively.

FIG. 7 depicts an exemplary embodiment of a continuously and rapidly sintered tape.

DETAILED DESCRIPTION

Figure 1:
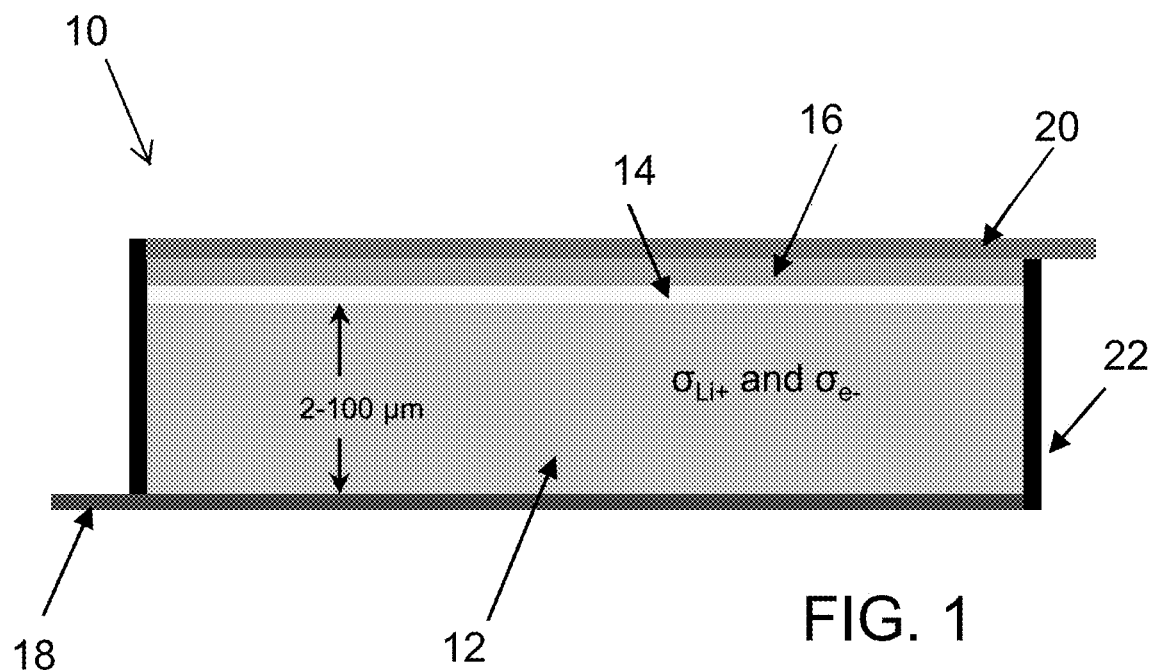
FIG. 1 is a schematic, cross-sectional view depicting a lithium-ion battery having a sintered cathode, according to an exemplary embodiment.

Referring generally to the figures, various embodiments of a sintered electrode that includes a chalcogenide or fluoride and at least one alkali metal or alkaline earth metal are disclosed. The sintered electrode has a thickness of 2 μm to 100 μm and a cross-sectional area of at least 3 $cm^2$. Compared to conventional electrode materials, the sintered electrode can be made much larger and self-supporting than typical thin-film formed electrodes and is usable without any additional finishing techniques, such as grinding or polishing, in contrast to other sintered electrodes. The disclosed sintered electrodes are able to achieve these advantages through a tape manufacturing process that allows for must faster manufacturing speeds of "medium" thickness electrode materials in which processing speed is independent of electrode thickness. That is, the electrodes can be made thicker than conventional electrodes made through thin film techniques and thinner than other sintered electrodes that have to be ground down to usable sizes. Moreover, the electrode can be rapidly sintered in a more economical process than is currently used for manufacturing electrode materials. Indeed, conventional processes typically utilize thin film techniques that are much slower and more difficult to build up thick layers. In this way, the relatively thicker sintered electrodes of the present disclose not only eliminate inactive components, such as mechanical supports, but also increase the charge capacity of the battery. Moreover, the thickness of the electrode and tape-casting manufacturing process allow for electrode materials to be manufactured in a roll-to-roll format.

The sintered electrodes disclosed herein are envisioned to be suitable for a variety of battery chemistries, including lithium-ion, sodium-ion, and magnesium-ion batteries as well those using solid state or liquid electrolyte. Various embodiments of the sintered electrode, manufacturing process, and lithium-ion batteries are disclosed herein. Such embodiments are provided by way of example and not by way of limitation.

As mentioned, various embodiments of a sintered electrode composed of chalcogenide compound including at least one of an alkali metal or alkaline earth metal. As used herein, a chalcogenide compound refers to an oxide, sulfide, or selenide compound. In other embodiments, the sintered electrode may be a fluoride compound. In embodiments, the chalcogenide includes at least one of lithium, sodium, or magnesium. In embodiments, the chalcogenide also includes at least one transition metal, such as cobalt, manganese, nickel, niobium, tantalum, vanadium, titanium, copper, chromium, tungsten, molybdenum, tin, germanium, antimony, bismuth, or iron.

Exemplary embodiments of a lithium chalcogenide include lithium cobaltite (LCO), lithium manganite spinel (LMO), lithium nickel cobalt aluminate (NCA), lithium iron phosphate (LFP), lithium cobalt phosphate (LCP), lithium titanate, lithium niobium tungstate, lithium nickel manganate, and lithium titanium sulfide ($LiTiS_2$), among others. Exemplary embodiments of a sodium chalcogenide include $NaVPO_4F$, $NaMnO_2$, $Na_{2/3}Mn_{1-y}Mg_yO_2$ ($0<y<1$), $Na_2Li_2Ti_5O_{12}$, or $Na_2Ti_3O_7$, among others. Exemplary embodiments of a magnesium chalcogenide include magnesiochromite ($MgCr_2O_4$) and $MgMn_2O_4$, among others.

In embodiments, the chalcogenide (or fluoride) is a first phase of the sintered electrode, and the sintered electrode contains at least one other phase (e.g., a second phase, a third phase, a fourth phase, etc.) intermixed with the first phase. In embodiments, the additional phase or phases are selected to provide additional functionality. For example, in an embodiment involving a lithium electrode, a second phase enhances the effective lithium conductivity of the electrode, for example a lithium garnet phase. In an embodiment, the second phase enhances electronic conductivity. The additional phase or phases can be added prior to sintering, or the sintered electrode may contain open porosity that may be infiltrated with the additional phase or phases. In embodiments, the second phase is a spinel that provides additional electronic conductivity.

One advantage of the sintered electrodes disclosed herein is that they can be made larger than conventional electrode materials for batteries, such as those made using thin-film techniques. In embodiments, the sintered electrode has a thickness of from 2 µm to 100 µm. In further embodiments, the sintered electrode has a thickness of from 20 µm to 80 µm, and in still other embodiments, the sintered electrode has a thickness of from 30 µm to 60 µm. Besides being thicker than thin-film electrodes, the sintered electrode can also be made with a relatively larger cross-sectional area. In embodiments, the sintered electrode has a cross-sectional area of at least 3 $cm^2$. In further embodiments, the sintered electrode has a cross-sectional area of at least 10 $cm^2$, and in still other embodiments, the sintered electrode has a cross-sectional area of at least 100 $cm^2$. In embodiments, the sintered electrode has a cross-sectional area of up to 1 $m^2$.

The sintered electrode is able to be made larger than conventional thin-film electrodes because the electrode is formed from a tape cast or extruded green tape that is rapidly sintered. In order to form the green tape, a slurry (or paste) is prepared from a powder component, a binder, and a solvent. The powder component includes a powdered compound or powdered compounds containing a chalcogenide and at least one alkali metal or alkaline earth metal. The powdered compounds containing the chalcogenide and the alkali metal or alkaline earth metal may be a single powdered compound. Alternatively or additionally, the compounds can include chalcogenide compound and a compound containing an alkali metal or alkaline earth metal. Further, in embodiments, the powdered compound can further contain a transition metal along with or in a separate compound from the chalcogenide compound and the compound containing an alkali metal or alkaline earth metal.

For example, with respect to a lithium electrode, the powdered compound can be a chalcogenide compound containing lithium and a transition metal, such as LCO or LMO. In another example, one compound can contain the chalcogenide and the compound containing an alkali metal or alkaline earth metal, and another compound can contain a transition metal. For example, with respect to a lithium electrode, the chalcogenide compound can be at least one of $Li_2O$, $Li_2CO_3$, LiOH, $LiNO_3$, lithium acetate ($CH_3COOLi$), or lithium citrate ($Li_3C_6H_5O_7$), among others, and the transition metal-containing compound can be at least one of $MnO_2$, $Mn_2O_3$, $Co_2O_3$, CoO, NiO, $Ni_2O_3$, $Fe_2O_3$, $Fe_3O_4$, FeO, $TiO_2$, $Nb_2O_5$, $V_2O_5$, $VO_2$, $Ta_2O_5$, or $WO_3$. In embodiments, the powder component of the slurry or paste (including all powdered compounds) comprises from 40% to 75% by weight of the slurry (or paste). In other embodiments, the powder component comprises from 45% to 60% by weight of the slurry (or paste), and in still other embodiments, the powder component comprises from 50% to 55% by weight of the slurry (or paste).

The slurry (or paste) is provided with a binder that holds the powder component together in the form of the green tape prior to sintering. In embodiments, the binder is at least one of polyvinyl butyral (PVB) (e.g., Butvar® PVB resins, available from Eastman Chemical Company), acrylic polymers (e.g., Elvacite® acrylic resins, available from Lucite International), or polyvinyl alcohol, among others.

The slurry (or paste) is also provided with a solvent in which the powder component and binder are dispersed. In particular, the solvent is selected so as to avoid leaching the alkali metal or alkali earth metal from the chalcogenide compounds in the slurry. Table 2, below, demonstrates leaching characteristics for two solvents with respect to lithium ions, non-polar 1-methoxy-2-propanyl acetate (MPA) and a polar ethanol-butanol mixture. In investigating the leaching characteristics of the two solvents, 200 g of the powdered electrode material identified in Table 2 were mixed with the 200 g of the solvent. The mixture was centrifuged, and the decanted liquid was analyzed for its lithium concentration via induction coupled plasma (ICP) spectroscopy. As shown in Table 2, the polar ethanol-butanol mixture contained a much greater concentration of lithium than the non-polar MPA. Such leaching of the lithium from the ceramics (e.g., LCO, LMO, etc.) can occur as the result of ion exchange or the formation of hydroxides. Once the lithium enters the solvent, there can be several unwanted side-effects. For example, the solubility of the binder may be reduced. Further, the dissolved lithium may interfere with dispersants. Still further, the dissolved lithium may migrate during drying, which may lead to chemical inhomogeneity in the dried tape. Additionally, the chemistry of the inorganic particles themselves is altered. Moreover, reaction with the solvent is time dependent so the slip properties are subject to continuous change and a potentially unstable process.

TABLE 1

Leaching of lithium from electrode material in non-polar and polar solvents.

| electrode Material | Solvent | Li Concentration ($\times 10^{-6}$ mg/L) |
|---|---|---|
| LMO | MPA | <0.005 |
| LMO | MPA | <0.005 |
| LMO | Ethanol-Butanol Mixture | 1.61 |
| LMO | Ethanol-Butanol Mixture | 1.77 |
| LCO | MPA | <0.005 |
| LCO | MPA | <0.005 |
| LCO | Ethanol-Butanol Mixture | 2.05 |
| LCO | Ethanol-Butanol Mixture | 2.28 |

Accordingly, in embodiments, the solvent is selected to be non-polar. In particular embodiments, the non-polar solvent has a dielectric constant at 20° C. of less than 20. In other embodiments, the non-polar solvent has as dielectric constant at 20° C. of less than 10, and in still other embodiments, the non-polar solvent has a dielectric constant at 20° C. of less than 5. Further, in embodiments, the solvent leaches less than 1 ng/L of the alkali metal or alkaline earth metal from the powder component in the slurry. In other embodiments, the solvent leaches less than 0.1 ng/L of the alkali metal or alkaline earth metal from the powder component in the slurry, and in still other embodiments, the solvent leaches less than 0.01 ng/L of the alkali metal or alkaline earth metal from the powder component in the slurry.

In embodiments, the chemistry of the binder may be adjusted to work with non-polar solvents, such as MPA. For example, Butvar® B-79 is a commercially available PVB that has a low concentration of hydroxyl groups from polyvinyl alcohol (11-13% by weight) and, compared to other PVB binders, has a low molecular weight. This allows for ease of dissolution and high solubility to control viscosity and enable a high loading of solids.

In embodiments, that slurry (or paste) may contain other additives that aid in processing. For example, in embodiments, the slurry (or paste) may contain between 0.1% to 5% by weight of a dispersant and/or of a plasticizer. An exemplary dispersant is fish-oil dispersant, and an exemplary plasticizer is dibutyl phthalate. Further, as will be discussed more fully below, the presence of transition metal oxides in the slurry (or paste) can cause a catalytic combustion reaction during sintering. Thus, in embodiments, the slurry (or paste) may contain additives to prevent or reduce the severity of such combustion reactions. In particular, the slurry (or paste) may contain an antioxidant, such as a phenol (e.g., butylated hydroxytoluene (BHT) or alkylated-diphenylamine), or materials with an endothermic decomposition like inorganic carbonates and hydroxides.

The slurry (or paste) is tape cast or extruded into a green tape having the desired thickness of the sintered electrode. As discussed above, the thickness may be in the range of from 2 μm to 100 μm. In embodiments, the green tape is dried to remove a substantial portion of the solvent, leaving primarily the chalcogenide compound containing the alkali metal or alkaline earth metal. In embodiments, drying may occur at ambient temperature or at a slightly elevated temperature of 60° C. to 80° C. (or begin at an ambient temperature and transition to an elevated temperature). Additionally, in embodiments, air is circulated to enhance drying. In embodiments, the amount of organic material remaining after drying is no more than 10% by weight of the dried green tape. Upon drying the green tape is debound and sintered. That is, the green tape is heated to a temperature at which the polymer binder and any other organics are burned off. In embodiments, debinding occurs in the temperature range of 175° C. to 350° C. Thereafter, the dried and debound green tape is sintered. Sintering occurs in the temperature range of 500° C. to 1350° C. Sintering time in this temperature range is less than 60 minutes. In embodiments, sintering time is less than 50 minutes, and in still other embodiments, sintering time is less than 45 minutes. Upon sintering, the sintered electrode has a porosity of no more than 30%. In embodiments, the sintered electrode tape has a porosity of no more than 25%. In other embodiments, the sintered electrode has a porosity of no more than 20%, and in still other embodiments, the sintered electrode has a porosity of no more than 15%. In embodiments, the porosity of the sintered electrode is at least 0.1%. As a result of the sintering process, in embodiments, the sintered electrode has on average a grain size of from 10 nm to 50 μm. In other embodiments, the grain size on average is from 50 nm to 10 μm, and in still other embodiments, the grain size on average is from 100 nm to 1000 nm.

Further, in embodiments, the sintered electrode has an open porosity such that fluid communication is provided between a first surface of the sintered electrode to the other surface. That is, in embodiments, the chalcogenide compound phase comprises a solid phase, and the porosity comprises a second phase in which the second phase is a continuous phase in the solid phase. Additionally, in embodiments, the pores of the sintered electrode tape are substantially aligned to promote ion transport. That is, the pores are aligned along an axis perpendicular to the first and second surfaces. For example, each pore may have a cross-sectional dimension that is longer than any other cross-sectional dimension of the pore, and the longer cross-section dimension is substantially aligned perpendicularly to the first and second surfaces of the electrode, e.g., on average, aligned to within 25° of perpendicular. Advantageously, in contrast to other sintered electrodes, the sintering process described produces a sintered electrode that requires no further finishing, such as mechanical grinding or polishing, prior to incorporating into a battery architecture. In particular, previous sintered electrodes were formed from large discs at much greater thicknesses, e.g., 500 μm to 1 mm, and had to be diced to usable dimensions and ground down to a usable thickness. Such grinding has reportedly only been able to achieve a thickness of about 130 μm, which is the practical limit for electrodes manufactured according to such processes. By tape-casting the electrode, not only is the process made more economical (e.g., no grinding/polishing steps and ability to utilize roll-to-roll fabrication), but also desirable thicknesses of the electrode material can be achieved.

Further, because the sintered electrode is self-supporting, the sintered electrode can be used as a substrate for deposition of additional layers. For example, a metallic layer (e.g., up to 5 μm) can be deposited onto a surface of the sintered electrode to serve as a current collector for a battery. Additionally, in an exemplary embodiment, a solid electrolyte, such as lithium-phosphorous-oxynitride (LiPON), lithium garnet (e.g., garnet LLZO ($Li_7La_3Zr_2O_{12}$)), or lithium phosphosulfide, may be deposited by RF-sputtering onto the sintered electrode. Alternatively, a thin layer of LiPON solid electrolyte can be applied through ammonolysis of a thin layer of $Li_3PO_4$ or $LiPO_3$ or through reactive sintering. Such processes are envisioned to be faster and potentially less capital intensive than conventional deposition techniques for solid electrolytes. Similarly, a solid electrolyte of lithium garnet (e.g., LLZO) can be applied by sol-gel, direct sintering, and reactive sintering.

Further, as a self-supporting layer, the sintered electrode can provide the basis for an advantaged manufacturing approach for lithium batteries that use a liquid electrolyte. In other words, the cathode (i.e., sintered electrode) is a substrate of the battery. In particular, the sintered electrode can be made in a continuous process and used as a substrate for coating in either batch or roll-to-roll processing. Such processing could allow, for example, metallization of the sintered electrode by sputtering and/or electrolytic deposition to form a metallized sintered electrode. In this way, the thickness of the electrode current collector metal can for a conventional lithium battery can be reduced from the typical thickness of 10-15 µm to less than 5 µm, less than 1 µm, or even less than 100 nm. Further, the metallized sintered electrode can be supplied in piece or roll form as a stand-alone component to a battery cell manufacturer. Advantageously, such metallized sintered electrodes reduce the volume of the cell typically reserved for the current collector, allowing for more active electrode material and higher capacity.

In this regard, the sintered electrode is particularly suitable for use in ion intercalation type batteries. An exemplary embodiment of a lithium-ion battery 10 is shown in FIG. 1. The lithium-ion battery 10 includes a sintered cathode 12, an electrolyte layer or region 14, and an anode 16. In embodiments, the sintered cathode 12 has a thickness of from 2 µm to 100 µm. Additionally, in embodiments, the sintered cathode 12 has a cross-sectional area of at least 3 cm$^2$. Advantageously, the sintered cathode 12 mechanically supports the lithium-ion battery 10 such that the sintered cathode 12 is not carried on a mechanical support, such as a zirconia support. The advantage of this architecture is that inactive components are substantially excluded from the battery. That is, while providing the function of a mechanical support, the sintered cathode 12 is still an active component and contributes to the capacity of the battery. Accordingly, the cathode-supported design can give the same overall capacity in a thinner form-factor, or the thickness of the cathode can be increased for a higher net capacity at the same size.

Further, the sintered cathode 12 can be used in both solid-state and liquid electrolyte lithium-ion batteries. In particular, in a solid-state battery, the electrolyte layer 14 includes a solid-state electrolyte (e.g., having a conductivity of $>10^{-6}$ S/cm), such as LiPON, lithium garnet (e.g., LLZO), or lithium phosphosulfide. More particularly, in a solid-state battery, the electrolyte layer 14 includes a solid electrolyte, such as LiPON, lithium garnet (e.g., LLZO), lithium phosphosulfide, or lithium super ionic conductor (LISICON), with a combination of lithium ion conductivity and thickness such that the area specific resistance is less than about 100 Ωcm$^2$. One advantage of LiPON, in particular, is that it is resistant to dendrite formation. In a liquid electrolyte battery, the electrolyte layer 14 includes a liquid electrolyte, such as LiPF$_6$-DMC (lithium hexafluorophasophate in dimethyl carbonate), and a polymer or ceramic separator to separate the cathode 12 and anode 16. In either case, the sintered cathode 12 increases the charge capacity over conventional lithium-ion batteries.

The battery 10 also includes a first current collector 18 disposed on a first surface of the sintered cathode 12. In the embodiment depicted, a second current collector 20 is disposed on the anode 16; however, in embodiments, the anode may be a metal (such as lithium metal or magnesium metal) in which case a current collector may be excluded. Further, in the embodiment depicted, the battery 10 is encased in a protective coating 22. In embodiments, the first current collector 18 is copper, and the second current collector 20 (when used) is aluminum. The protective coating 22 may be, e.g., parylene.

While the depicted embodiment only includes a sintered cathode 12, the anode 16 may also be a sintered electrode according to the present disclosure. For a lithium-ion battery, the (sintered) cathode 12 may include at least one of lithium cobaltite, lithium manganite spinel, lithium nickel cobalt aluminate, lithium iron phosphate, lithium cobalt phosphate, lithium nickel manganate, or lithium titanium sulfide, and the (sintered) anode 16 may include at least one of lithium titanate or lithium niobium tungstate.

Additionally, while a lithium-ion battery is depicted, the battery could instead be based on sodium-ion, calcium-ion, or magnesium-ion chemistries. For a sodium-ion battery, the (sintered) cathode 12 may include at least one of NaMnO$_2$, Na$_{2/3}$Mn$_{1-y}$Mg$_y$O$_2$ (0<y<1), or NaVPO$_4$F, and the (sintered) anode 16 may include at least one of Na$_2$Li$_2$Ti$_5$O$_{12}$ or Na$_2$Ti$_3$O$_7$. For a magnesium-ion battery, the (sintered) cathode 12 may include at least one of MgCr$_2$O$_4$ or MgMn$_2$O$_4$, and the anode 16 may magnesium metal (which could also serve as the current collector 20). Any of the foregoing battery chemistries may utilize a liquid electrolyte comprising a solvent (e.g., DMC) and a salt with a cation matching the intercalant ion. Additionally, for a sodium-ion battery, sodium super ionic conductor (NASICON) may be used as a solid-state electrolyte.

Figure 2:
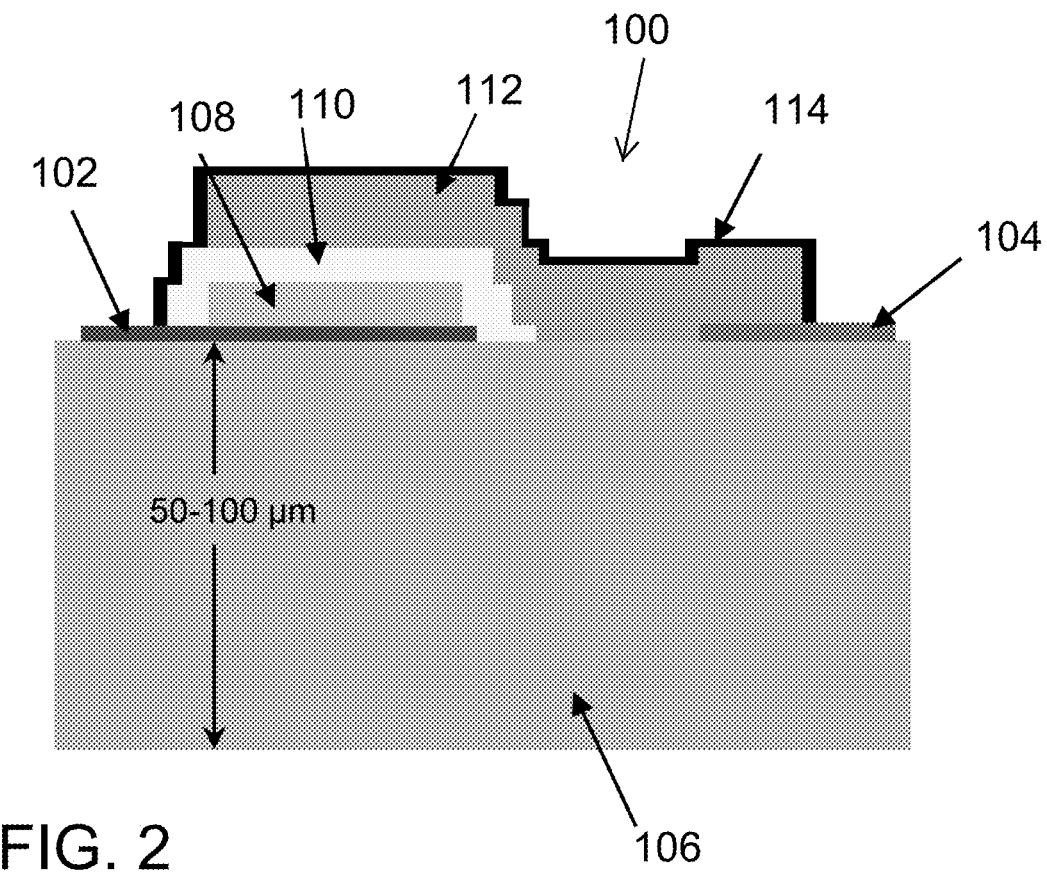
FIG. 2 is a schematic, cross-sectional view of a conventional lithium-ion battery.

For the purposes of demonstrating the gain in capacity, FIG. 2 provides a schematic cross-section of a conventional solid-state, thin-film micro-battery 100. The micro-battery 100 includes a cathode current collector 102 and an anode current collector 104 deposited onto an inert mechanical support 106. A cathode 108 (e.g., LCO or LMO) is formed onto the cathode current collector 102 and is surrounded by a solid-state electrolyte 110 (e.g., LiPON). An anode 112 is deposited over the electrolyte 110 and over the anode current collector 104. A coating 114 is provided to protect the cathode 108, electrolyte 110, and anode 112. In the conventional battery design, the mechanical support 106 is relied upon for handling during fabrication of the battery 100 and is the platform for the deposition of the cathode 108 and electrolyte 110 layers. The mechanical support 106 typically has a thickness of 50 µm to 100 µm. The mechanical support 106 and the protective coating 114 also provide rigidity in the final package and help prevent damage.

In these conventional batteries 100, the cathode 108 is typically grown to desired thickness by processes such as RF sputtering or pulsed laser deposition. These deposition techniques are another reason why the conventional battery 100 requires the use of mechanical support 106. Such conventional methods produce cathode materials at a rate of <10 µm/hr, which creates a practical and commercial limit to the achievable thicknesses of these conventional cathode materials. As a consequence, thin film micro-batteries have only found applications where small size power sources are needed like smart cards, medical implants, RFID tags, and wireless sensing.

Figure 3:
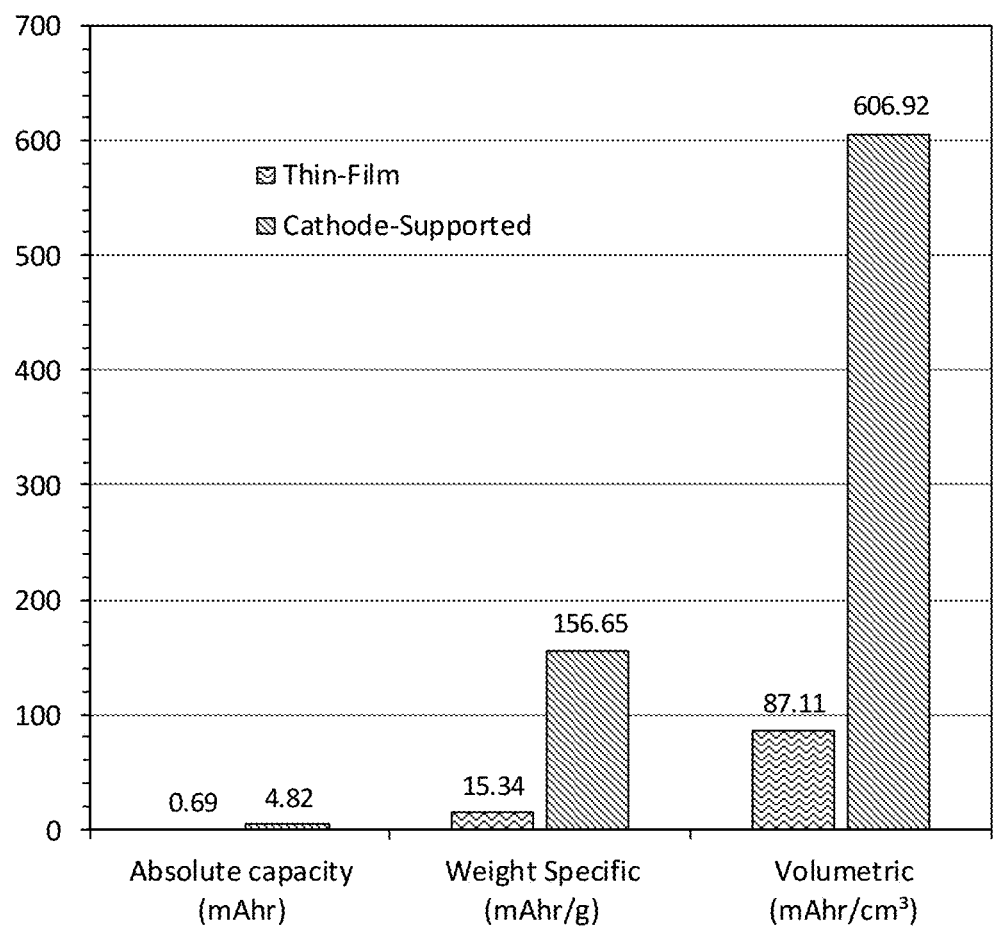
FIG. 3 is graph of the charge capacity of the battery of FIG. 1 as compared to the charge capacity of the battery of FIG. 2.

A comparison of the charge capacity of battery 10 of FIG. 1 according to the present disclosure and the charge capacity conventional battery 100 of FIG. 2 is shown in FIG. 3. The comparison is made at nominally identical thicknesses of 80 µm. In particular, the comparison is made between (1) a conventional battery 100 having a 50 μm thick mechanical support 106 of zirconia and a cathode that is 5 μm thick and (2) the presently disclosed battery 10 having a cathode 12 that is 35 μm thick. Notably, the thickness of the cathode 12 of the presently disclosed battery 10 is less than the thickness of the mechanical support 106 of the conventional battery 100, allowing space to be reserved for lithium metal at the anode 16. As can be seen in FIG. 3, the extra thickness of the sintered cathode 12 and removal of the mechanical support 106 provides a seven-fold higher capacity in absolute and volumetric terms, and the capacity is ten-fold greater on a weight basis.

Besides simply allowing for a larger electrode, the sintered cathode 12 of the depicted embodiment also provides structural advantages that increase its charge capacity over conventional cathodes. In a conventional cathode 108, the active cathode particles make point contacts. The cross-sectional areas of the contacts are small and so have a high impedance to movement of lithium ions and electrons. In order to overcome this impedance issue, carbon is added to the electrode as a conductive pathway to facilitate transport of electrons into and out of the active particles, and pore space in the electrodes are infiltrated with liquid electrolyte for fast conduction of lithium ions. The use of carbon in this manner creates a tradeoff between capacity of the batter and charge/charge rate performance. The other issue with the point contacts between the active cathode particles is that they are weak, and so polyvinyl fluoride (PVF) is used to bind the active particles and carbon together to give the structure strength during processing. In contrast, particles in the depicted sintered cathode 12 are bonded to one another, and so, the electronically conductive carbon and binder may be eliminated. In this way, the proportion of space allocated to porosity for movement of lithium ions may be reduced, and more space can be dedicated to active material with a sintered cathode. The inventors estimate that for a given cathode material, the capacity in aggregate can be raised by approximately 30% on the basis of equal cathode thicknesses. Alternatively, the cathode thickness could be reduced by 20-25% while keeping the capacity the same for a more compact battery. As mentioned above, the pores in the sintered cathode 12 can be aligned in the direction of transport of ions to and from the anode so as to enable further improvements in space utilization or to boost power density.

Experimental Examples

Five exemplary green tapes, including one comparative example (E1), one reference example (E4) and three examples according to the present disclosure (E2, E3, and E5), were prepared by tape casting the slurries described in Table 2. The LMO and LCO powders were obtained commercially from GELON LIB GROUP (Linyi, Shandong, China), and the alumina powder was obtained from Sasol (Houston, Tex.). The polyvinyl butyral binder was Butvar® B-79 obtained commercially from Eastman Chemical Company (Kingsport, Tenn.).

TABLE 2

Formulations of tape casting slurries

| | Weight Percentages | | | | |
|---|---|---|---|---|---|
| Slurry Component | E1 | E2 | E3 | E4 | E5 |
| $LiMn_2O_4$ (LMO) | 48.98 | 52.58 | | | |
| $LiCoO_2$ (LCO) | | | 52.58 | | 64.96 |
| Alumina | | | | 52.58 | |

TABLE 2-continued

Formulations of tape casting slurries

| | Weight Percentages | | | | |
|---|---|---|---|---|---|
| Slurry Component | E1 | E2 | E3 | E4 | E5 |
| 1-Methoxy-2-propanyl acetate (MPA) | 44.24 | 42.25 | 42.25 | 42.25 | 32.09 |
| Fish-Oil Dispersant | 0.85 | 0.84 | 0.84 | 0.85 | 0.64 |
| Dibutyl phthalate | 0.98 | 0.84 | 0.84 | 0.84 | 0.64 |
| Polyvinyl butyral binder | 4.95 | 3.49 | 3.49 | 3.49 | 1.69 |
| Total non-volatile organics without MPA | 12.17 | 8.95 | 8.95 | 8.95 | 4.35 |

Figure 4:
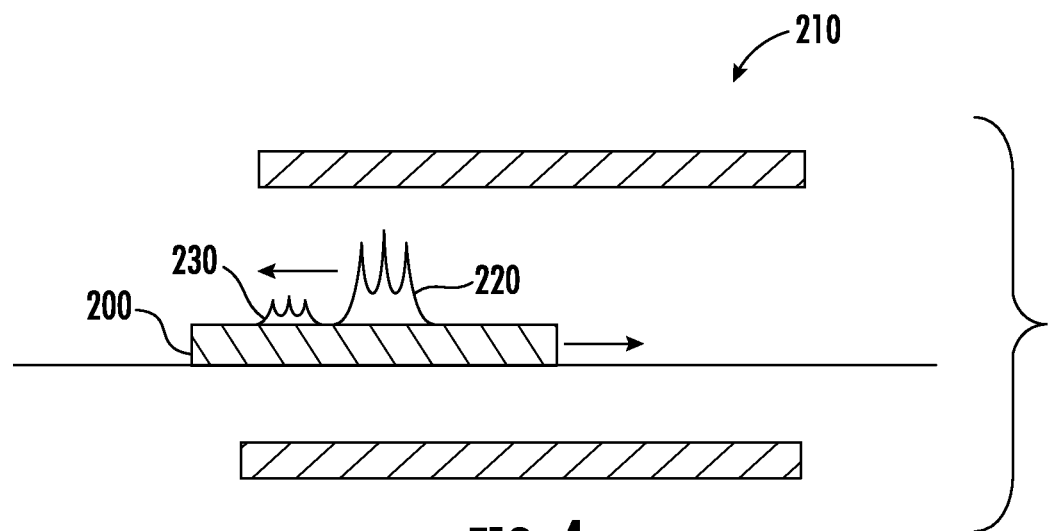
FIG. 4 depicts a green tape being sintered and illustrating the issue of flammability according to conventional sintering processes.

Tapes that contain lithium-ion battery electrode materials with concentrations of organics above 10% by weight are difficult to rapidly debind and fire. In particular, when the concentration of organic material is above 10% by weight, the tape may become flammable and ignite if a critical temperature is exceeded before binder is removed. Once ignited a combustion front propagates and cracks the tape. FIG. 4 depicts tape E1 of Table 2 in which the green tape 200 has entered the sintering chamber 210, and the binder has combusted 220, creating a propagation front 230. As can be seen in Table 2, the organic component of green tape E1 is 12.17% by weight, which is above the threshold of 10% by weight. The flammability of the tape is a process bottleneck that limits the practical rate of continuous debinding and firing to about 60 minutes. As mentioned briefly above, the flammability of green tape E1 results in part from the interaction between the reducible transition metal oxide in the electrode material and the organic materials. In particular, the transition metal oxides speed combustion by acting as a catalyst and by producing oxygen.

Figure 5:
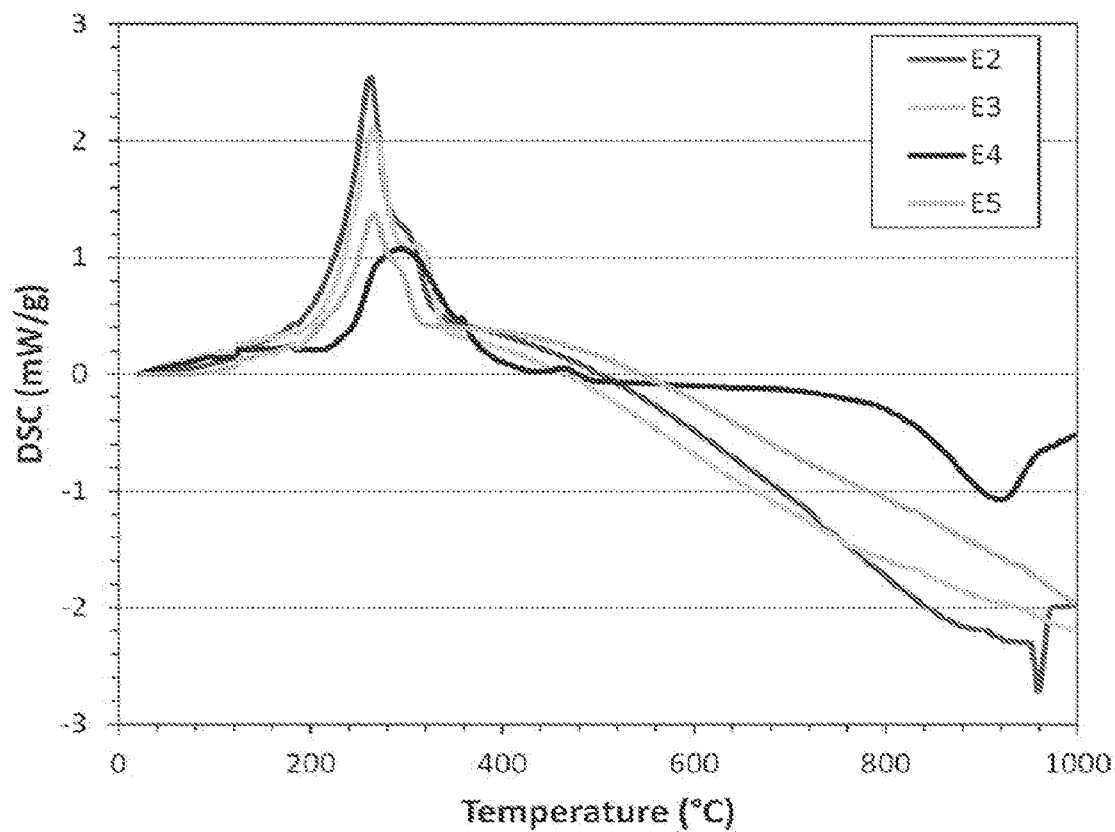
FIG. 5 depicts a graph of DSC curves illustrating heat release as a function of temperature during drying/sintering.

The effect is illustrated in differential scanning calorimetry (DSC) traces shown in FIG. 5. As can be seen there, tapes E2 and E3 contain LMO and LCO, respectively, and begin to combust at approximately 80° C. lower than reference tape E4 with alumina (which does not contain a transition metal). In comparison to tape E4, the total amount of heat released for tapes E2 and E3 is greater because LMO and LCO of tapes E2 and E3, respectively, promote more complete combustion of organics while volatile oxides escape the alumina tape E4. However, as can be seen in the trace of tape E5 in which the amount of organic material is below 5% by weight, the heat released becomes comparable to the alumina reference tape E4. That is, for tape E5, the concentration of combustible organics was reduced by more than half to just 4.35% by weight. While the temperature for onset of combustion is the same, the total amount of released heat drops in concert with the change in concentration of organics relative to tape E4. At the lower binder concentration, the tape may be debound and sintered at significantly higher speeds.

Despite the much lower binder concentration, it was surprisingly found that tape E5 was sufficiently strong for release from the polymer carrier film and for manual handling. FIGS. 6 and 7 provide pictures of two examples of tape E5 that were rapidly sintered. The size of each tape was approximately 8 cm long by 4 cm wide. The tape in FIG. 6A was debound by pulling through the furnace at 300° C. in a first pass and then sintering in a second pass at 1100° C. Each pass lasted for ten minutes for a total processing time of 20 min. The example in FIG. 6B was debound and sintered in a single step by pulling into the furnace at 1100°

C. at a rate of 32 in/min (total residence time of 75 seconds). The sintered thickness of the tape E5 was nominally 60 μm.

The rapid sintering can be operated in a continuous fashion working with individual pieces or in a roll-to-roll configuration. The process efficiently produces large areas of sintered electrode material with thicknesses relevant for batteries. FIG. 7 is an example of continuously and rapidly sintered tape of the E5 formulation that approximately 40 mm wide by 600 mm long and is 70 μm thick. Debinding and sintering were conducted in a single step with a total residence time of 20 min at a maximum temperature of 1100° C.

Besides lowering the concentration of combustible organics in the green tape, other means to lessen flammability are envisioned. As mentioned above, combustion may be slowed by the addition of a small quantity of antioxidant to the slurry. Additionally, the powder component may be selected based on the ability of the powdered compounds to undergo an endothermic reaction in the temperature range of 200° C. to 300° C. For example, to produce the LCO or LMO, $CoCO_3$ or $MnCO_3$ may be included in the slip along with a balance of $Li_2CO_3$ for reaction to form $LiCO_2$ (LCO) or $LiMn_2O_4$ (LMO) during the sinter step. Decomposition of either carbonate takes place between 150° C. and 300° C., and the process is endothermic, thereby inhibiting combustion. In this way, the amount of binder material can be increased as desired, e.g., for strengthening of the green tape.

Figure 8:
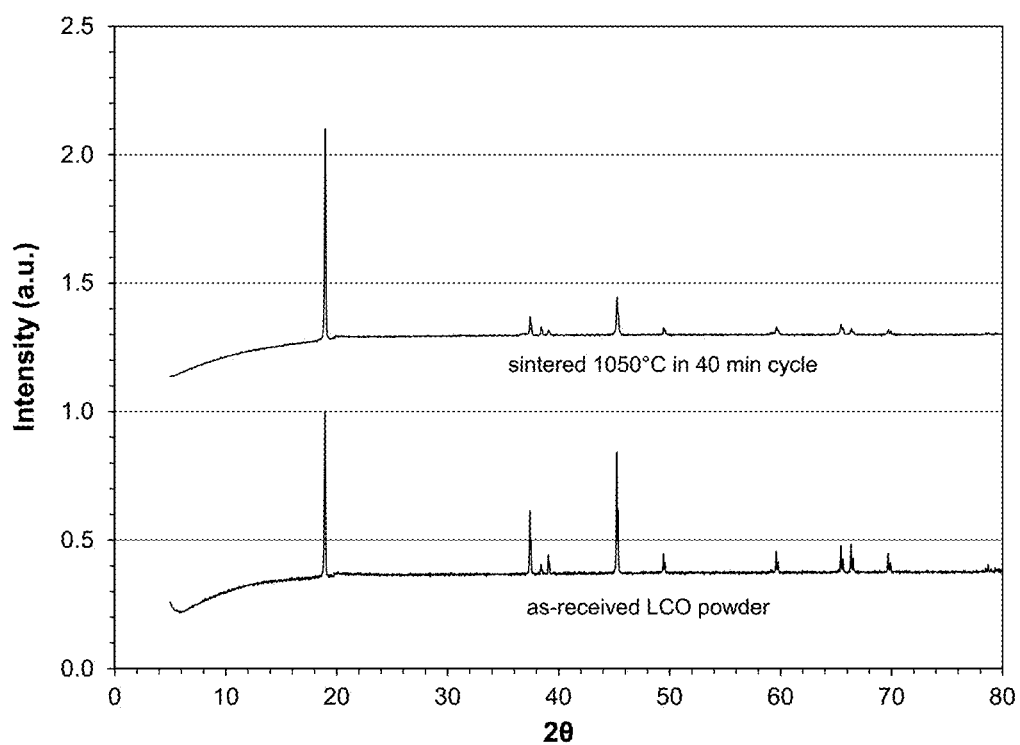
FIG. 8 is a comparison of the XRD spectra for the sintered LCO tape as compared to the as-received LCO powder.
Figure 9:
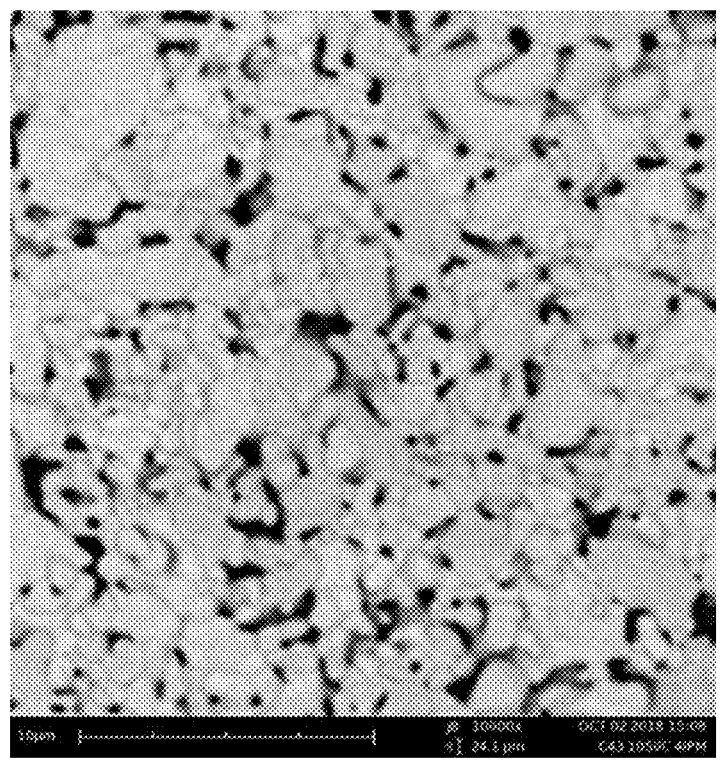
FIG. 9 is an SEM image of an as-fired LCO tape sintered at 1050° C. for 40 min.

A coupon of LCO tape composition E5 that measured 90 cm by 40 cm was sintered at 1050° C. in a cycle with a total duration of 40 minutes. The as-sintered tape had a nominal thickness of 60 μm. As shown in FIG. 8, powder x-ray diffraction confirmed that the chemistry and structure of the sintered LCO is similar to that of the as-received LCO. FIG. 9 is an SEM image of the sintered tape's as-fired surface. The porosity was estimated to be 8-10% by image analysis, and the pore structure was determined to be open via a dye test.

Figures 10A, 10B:
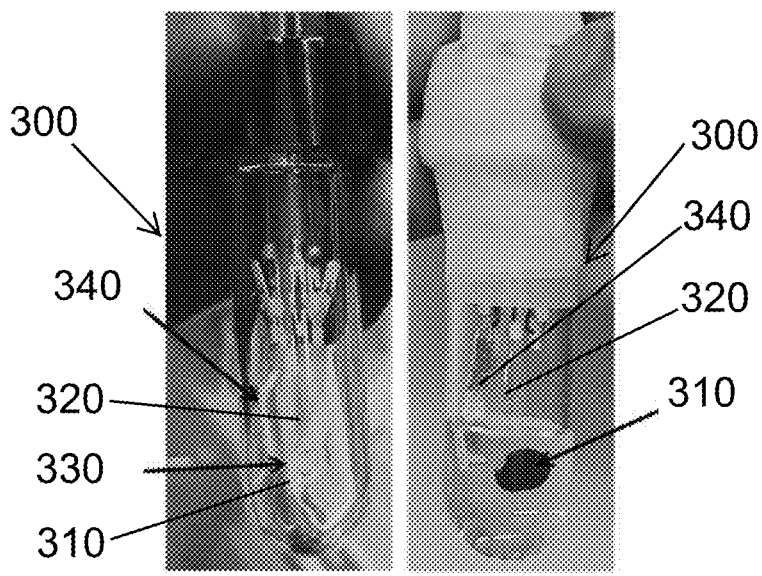
FIGS. 10A and 10B are pictures of an electrochemical cell having a sintered cathode according to an exemplary embodiment.
Figure 11:
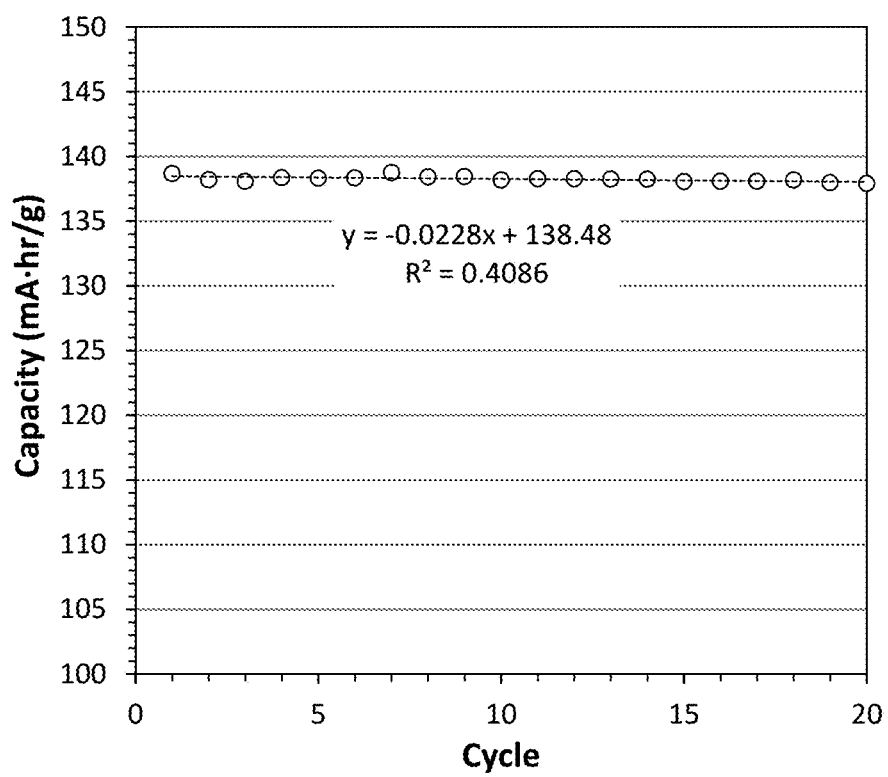
FIG. 11 depicts a graph of charging capacity as a function of the number of charge/discharge cycles for the electrochemical cell of FIGS. 10A and 10B.
Figure 12:
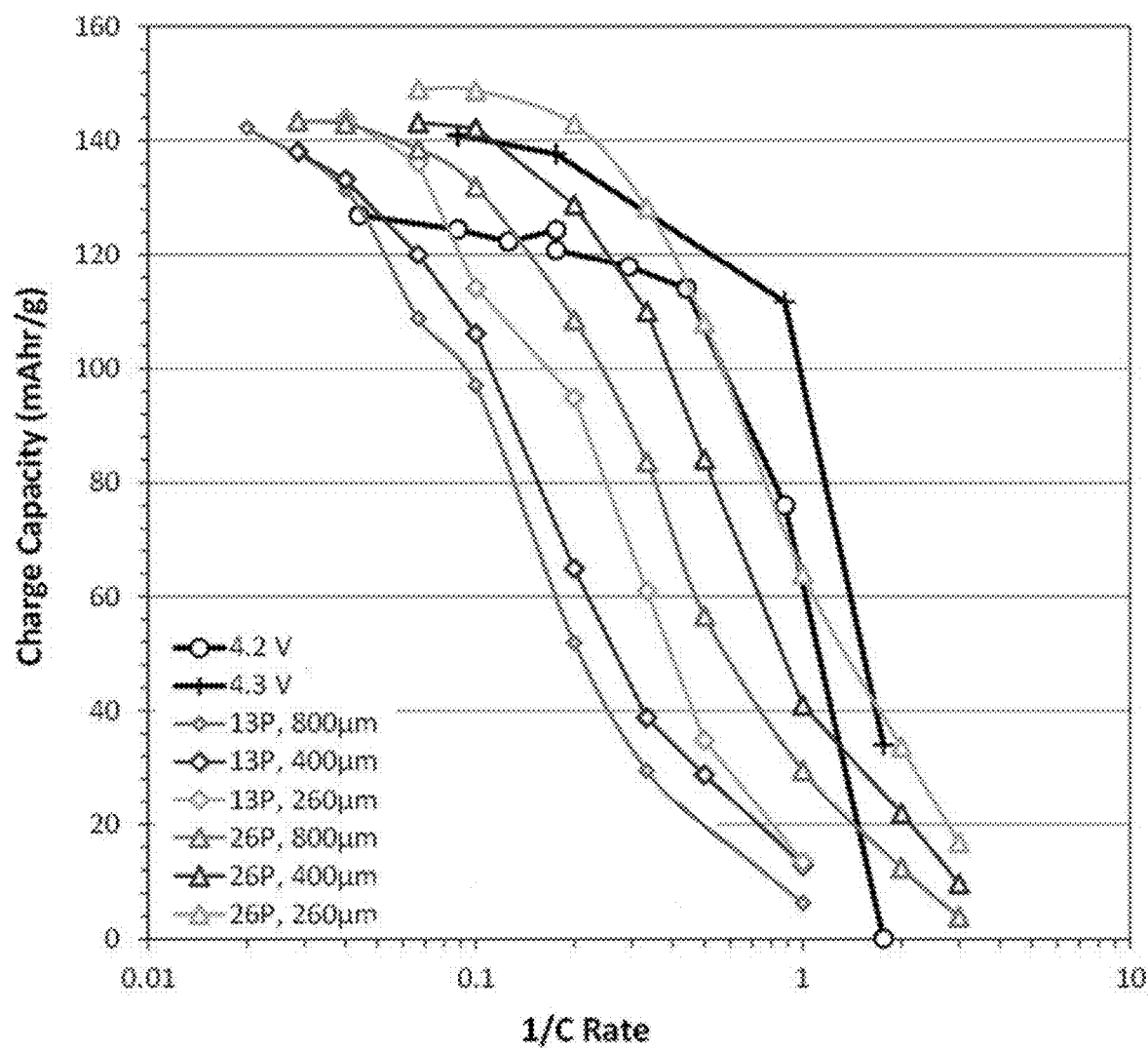
FIG. 12 depicts a graph of charging capacity for the electrochemical cell of FIGS. 10A and 10B as compared to other cathode materials having different porosities and thicknesses.

The charge capacity of the exemplary tape cast and sintered electrode was determined by preparing an electrochemical cell 300 as shown in FIGS. 10A and 10B. A cathode disc 310 of the sintered electrode was laser cut to a diameter of 8 mm. Electrical connection to the cathode disc 310 was made with a 4 mil platinum wire 320 that was secured by gold ink 330. The gold ink also fully covered one face of the cathode disc 310 as shown in FIG. 10A so as to force transport of lithium ions through the other face shown in FIG. 10B. The anode 340 was selected to be lithium metal, which also served as a reference electrode. The cathode disc 310 was immersed in a solution of 1 M $LiPF_6$ in 50:50 ethylene carbonate and dimethyl carbonate electrolyte (BASF Selectilyte LP-30) such that the pores were filled with the conductive fluid. The sample was subjected to charge-discharge cycling at rates of C/20 to 2C. Charging was performed under constant current and then constant voltage charging with 4.2 or 4.3 V potentials. Discharge was at constant current and down to 3 V limit. FIG. 11 shows the charge capacity and stability of the sintered LCO cathode disc 310 through twenty charge-discharge cycles at a C/5 rate and 4.3 V charging potential. The capacity closely matches the theoretical value of 140 mAhr/g for LCO, and there is no evidence of fade in capacity as cycles are accumulated. Thus, the tape cast and rapidly sintered LCO showed near theoretical capacity in the testing of the electrochemical cell. The rapidly sintered LCO electrode also retained high capacity as charging speed increased. As shown in FIG. 12, there is little drop in capacity even as charging speed is increased at fixed potentials of 4.2 and 4.3 V up C/2.

Figure 13A:
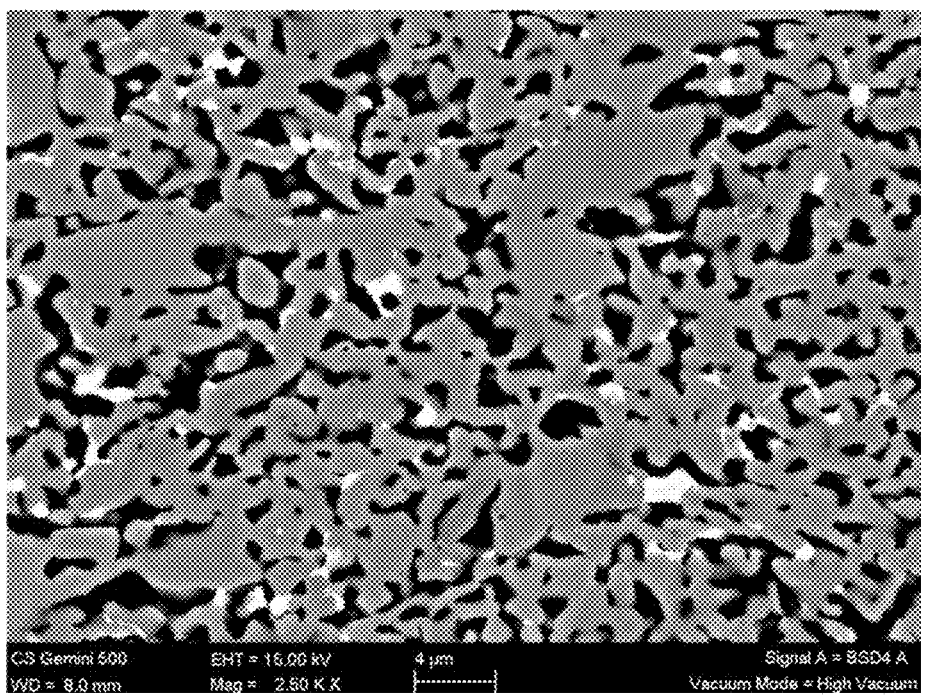
FIGS. 13A and 13B depict SEM images of the microstructure of LCO immediately after sintering and after charge-discharge cycling, respectively.
Figure 13B:
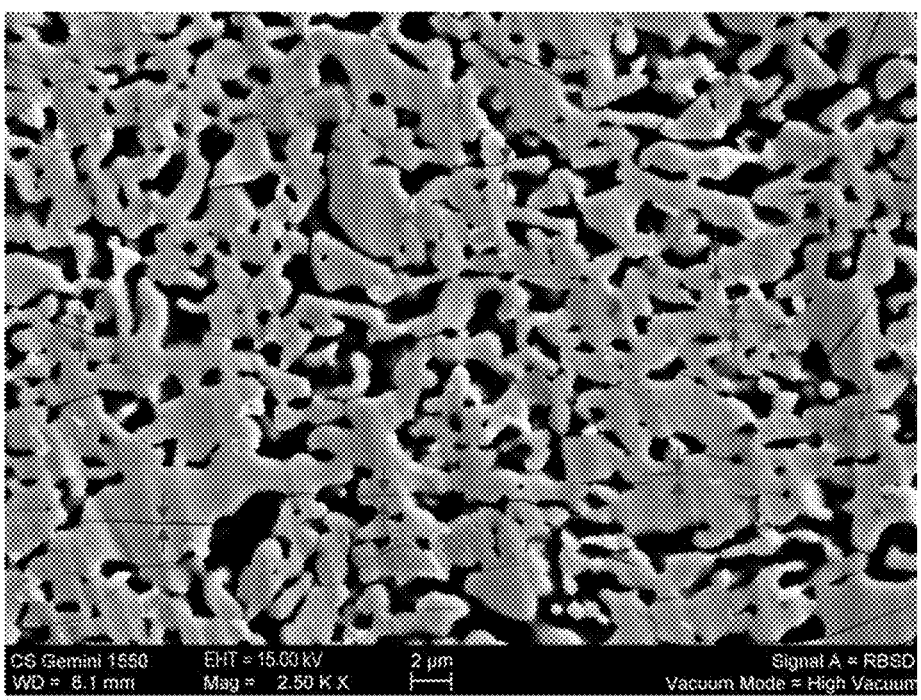

The inventors were surprised by the unexpected result that capacity was retained through multiple charge-discharge cycles. A fade or even abrupt failure had been expected from cracking of the brittle sintered electrode. There are two mechanisms known to drive cracking. One is a large bulk strain in the electrode with intercalation and de-intercalation of lithium. Mismatch strains arising from differential states of charge through the thickness of the electrode, especially when charging or discharging at high rates, tend to exceed the strain tolerance of a brittle ceramic. LCO and most other electrode materials, such as LFP, are anisotropic, and so, differential expansion on charge-discharge cycling drives microcracking. The cracks are thought to break up the electrode leading to formation of isolated islands and increase tortuosity for transport of electrons. The microstructure of LCO immediately after sintering is shown in FIG. 13A, and the microstructure of LCO after charge-discharge cycling is shown in FIG. 13B. As can be seen in a comparison of FIGS. 13A and 13B, microcracks have developed after charge-discharge cycling. While such microcracks did not affect the charge capacity of the LCO electrode, the microcracks could be avoided by making the grain size sufficiently small.

The plot in FIG. 12 also makes a comparison with thicker conventionally sintered and machined cathodes. According to the literature, the cathodes were sintered from 12.5 mm diameter pressed pellets of LCO in a bed of the same powder to limit loss of lithium. The heating rate was 9° C./min and soak time was 90 min. The sintered pills were ground to remove a dense outer shell, polished to 5 μm roughness and diced into 2.2 mm square sections. The diced pieces were finished to a thickness down to 260 μm, had two levels of open porosity (13% and 26%), and were evaluated for potential use as high capacity and energy density microbatteries. The cells utilized liquid electrolyte and conventional porous polymer separator. There were two differences in testing conditions. In particular, the cells were charged at constant current up to a potential of 4.25 V and discharged down to 2.5 V. In the conventionally produced cathode, porosity was important for infiltration by liquid electrolyte to provide a more conductive pathway for lithium ions than is available from the LCO alone. The importance of the pores grows as the thickness of the electrode increases. Even at 26% porosity, the thinnest 260 μm cathode showed a marked drops in charge capacity charging at a rate of C/3. As such, the conventional cathodes present a difficult trade-off between volumetric capacity and charging rate. That is, porosity must be added to reach faster charging rates, but this comes at the expense of capacity.

In contrast, the sintered electrode disclosed herein was made in a thinner form factor of 60 μm without the need to employ costly machining processes. The thickness is not reduced to such an extent that it becomes small in proportion to thicknesses of other components, such as 1-2 μm layer of LiPON electrolyte in a thin film battery. However, its thickness is still roughly a factor of four less than the conventional cathodes referenced in FIG. 12. As such, transport distances for lithium ions and electrons are shortened, and capacity is retained to high charging speeds with little dependence on porosity to hold a lithium conducting electrolyte. The capacity of the sintered cathode at one C is more than 80% of theoretical at a current density of 3.5 $mA/cm^2$.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one. As used herein, the term "porosity" is described as a percent by volume (e.g., at least 10% by volume, or at least 30% by volume), where the "porosity" refers to the portions of the volume of the sintered article unoccupied by the inorganic material.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of making a sintered electrode comprising:
   forming a slurry, as wt % of the slurry, comprising:
      40 wt % to 75 wt % of a powder comprising a chalcogenide and at least one of an alkali metal or an alkaline earth metal;
      1 wt % to 10 wt % of a binder; and
      30 wt % to 50 wt % of a solvent, wherein the solvent leaches less than 1 ng/L of the at least one of the alkali metal or the alkaline earth metal;
   casting the slurry into a green tape;
   drying the green tape to form a dried green tape by removing at least a portion of the solvent, the dried green tape comprising at most 10 wt % of organic material in the dried green tape; and
   sintering the dried green tape at a temperature from 500° C. to 1350° C. for no more than 60 minutes to form the sintered electrode comprising a first surface and a second surface opposite the first surface.

2. The method of claim 1 wherein the powder comprises lithium.

3. The method of claim 1, wherein the solvent leaches less than 0.1 ng/L of the at least one of the alkali metal or the alkaline earth metal.

4. The method of claim 1, wherein the solvent is a non-polar solvent comprising a dielectric constant at 20° C. of less than 20.

5. The method of claim 1, wherein the solvent comprises 1-methoxy-2-propanyl acetate (MPA).

6. The method of claim 1, wherein the sintered electrode comprises a lithium chalcogenide selected from a group consisting of: lithium cobaltite (LCO), lithium manganite spinel (LMO), lithium nickel cobalt aluminate (NCA), lithium iron phosphate (LFP), lithium cobalt phosphate (LCP), lithium titanate, lithium niobium tungstate, lithium nickel manganate, lithium titanium sulfide ($LiTiS_2$), and combinations thereof.

7. The method of claim 6, wherein the slurry comprises an approximately stoichiometric amount of lithium for the lithium chalcogenide of the sintered electrode.

8. The method of claim 6, wherein the slurry is approximately free of $LiCO_3$.

9. The method of claim 1, wherein the dried green tape comprises a component that undergoes an endothermic reaction from 200° C. to 300° C. during the sintering.

10. The method of claim 1, wherein the binder comprises polyvinyl butyral, an acrylic polymer, polyvinyl alcohol, or combinations thereof.

11. The method of claim 1, wherein the sintered electrode comprises a thickness between the first surface and the second surface from 2 micrometers to 100 micrometers.

12. The method of claim 1, wherein a cross-sectional area of the first surface is at least 3 $cm^2$.

13. The method of claim 1, wherein the sintered electrode has an open porosity from 0.1% to 30%.

14. The method of claim 13, wherein the open porosity comprises a pore phase that is continuous within a solid phase of the sintered electrode.

15. The method of claim 1, wherein the drying comprises heating the green tape at a temperature of 60° C. to 80° C.

16. The method of claim 1, wherein the sintering occurs for less than 45 minutes.

17. The method of claim 1, wherein a charging capacity of a battery comprising the sintered electrode as a cathode is maintained at greater than 135 mA·hr/g after twenty charge-discharge cycles at a C/5 rate and 4.3 V charging potential, wherein the cathode is unground and unpolished.

18. The method of claim 1, wherein the sintered electrode comprises an average grain size from 100 nanometers to 1000 nanometers.

19. A method of making a battery comprising:
   the method of claim 1, the sintered electrode comprising a cathode, the sintered electrode is unground and unpolished;
   disposing a current collector on the first surface of the sintered electrode;
   contacting the sintered electrode with an electrolyte, the electrolyte penetrating a porous region of the sintered electrode; and
   disposing an anode on the electrolyte.

* * * * *

UNITED STATES PATENT AND TRADEMARK OFFICE
CERTIFICATE OF CORRECTION

PATENT NO. : 11,791,465 B2
APPLICATION NO. : 17/848627
DATED : October 17, 2023
INVENTOR(S) : Michael Edward Badding et al.

It is certified that error appears in the above-identified patent and that said Letters Patent is hereby corrected as shown below:

On the Title Page

On page 2, in Column 2, under item (56) "Other Publications", Line 2, delete "Jounral of He" and insert -- Journal of The --.

On page 2, in Column 2, under item (56) "Other Publications", Line 3, delete "(2011." and insert -- (2011). --.

On page 2, in Column 2, under item (56) "Other Publications", Line 13, delete "ares" and insert -- areas --.

On page 2, in Column 2, under item (56) "Other Publications", Line 15, delete "Batiery" and insert -- Battery --.

On page 2, in Column 2, under item (56) "Other Publications", Line 23, delete "Microbatieries" and insert -- Microbatteries --.

On page 2, in Column 2, under item (56) "Other Publications", Line 31, delete "Batiery" and insert -- Battery --.

On page 2, in Column 2, under item (56) "Other Publications", Line 32, delete "NCM)" and insert -- (NCM) --.

On page 2, in Column 2, under item (56) "Other Publications", Line 34, delete "30m" and insert -- 30μm --.

On page 2, in Column 2, under item (56) "Other Publications", Line 40, delete "Upon" and insert -- LiPON --.

Signed and Sealed this
Twenty-third Day of April, 2024

Katherine Kelly Vidal
*Director of the United States Patent and Trademark Office*

In the Claims

In Column 15, Line 44, in Claim 2, delete "claim 1" and insert -- claim 1, --.